United States Patent [19]

Johnson

[11] 4,277,825
[45] Jul. 7, 1981

[54] CONVERTER APPARATUS

[75] Inventor: Frederick O. Johnson, Monroeville, Pa.

[73] Assignee: Westinghouse Electric Corp., Pittsburgh, Pa.

[21] Appl. No.: 61,533

[22] Filed: Jul. 27, 1979

[51] Int. Cl.³ .............................................. H02P 13/24
[52] U.S. Cl. ...................................... 363/87; 318/257; 363/96
[58] Field of Search .................... 318/257; 363/87, 96, 363/129

[56] References Cited

U.S. PATENT DOCUMENTS

| | | | |
|---|---|---|---|
| 3,551,782 | 12/1970 | Maynard | 318/257 X |
| 3,713,011 | 1/1973 | Johnson et al. | |
| 3,713,012 | 1/1973 | Johnson | 318/257 X |
| 4,173,722 | 11/1979 | Detering | 363/96 |

Primary Examiner—William M. Shoop
Attorney, Agent, or Firm—D. R. Lackey

[57] ABSTRACT

Converter apparatus including a power converter having controlled rectifier devices connected, and gated in a predetermined sequence, to interchange electrical power between a source of alternating potential and a direct current load circuit, a phase controller for controlling the conduction angle of the controlled rectifier devices, and circuitry for maintaining synchronous operation between the phase controller and the power converter. The circuitry for maintaining synchronous operation constrains the conduction angle between predetermined end stops by logically combining first and second logic signals developed for each controlled rectifier device from the source of alternating potential, with a logic signal associated with the immediately preceding controlled rectifier device in the gating sequence.

6 Claims, 7 Drawing Figures

CONVERTER APPARATUS

BACKGROUND OF THE APPARATUS

1. Field of the Invention

The invention relates in general to converter apparatus, and more specifically to power converter apparatus for interchanging electrical energy between alternating and direct current circuits.

2. Description of the Prior Art

Converter apparatus of the type which utilizes controlled rectifier devices, such as thyristors, connected to interchange electrical energy between alternating and direct current circuits, require some type of phase controller for controlling the conduction angle of the controlled rectifier devices. The conduction angle is controlled to regulate a predetermined parameter of the power converter, such as load current or load voltage.

It is important for proper operation of the converter apparatus that synchronous operation be maintained between the phase controller and power converter. In other words, the conduction angle of the gate drive signals applied to the controlled rectifier devices of the power converter must be constrained within predetermined limits, which will be referred to as rectification and inversion end stops.

U.S. Pat. No. 3,713,011 which is assigned to the same assignee as the present application, discloses an arrangement in which a single composite end stop signal is generated which is used to control all channels of the converter apparatus. The composite end stop signal is formed of segments of a plurality of timing waveforms, with the segments selected being determined by the conduction angle. The end stop signal is applied to first and second threshold circuits, which detect when the conduction angle reaches their respective limits and the conduction angle is maintained at the respective limit as long as the error signal is requesting operation beyond the limit.

While the converter apparatus and its end stop function of the hereinbefore mentioned U.S. Patent performs satisfactorily without excessive filtering, it would be desirable to reduce the cost of the converter apparatus while maintaining or improving its precision and noise immunity. It would further be desirable to be able to provide an adjustment range for one or both of the end stops, if such adjustment may be achieved without unduly increasing cost and/or circuit complexity.

SUMMARY OF THE INVENTION

Briefly, the present invention is new and improved converter apparatus of the type which includes controlled rectifier devices connected, and gated in a predetermined sequence, to interchange electrical power between alternating and direct current circuits. The converter includes a phase controller for controlling the conduction angle of the controlled rectifier devices in response to an error signal which indicates any difference between the actual operation of the converter apparatus and the desired operation.

The phase controller includes end stop means for constraining the conduction angle between predetermined rectification and inversion end stops or limits, with the end stop functions being generated with digital methods via a plurality of logic signals. The end stop means includes first means for providing a plurality of logic signals which are phase shifted by a predetermined angle from the various line voltages of a polyphase source. A selected pair of these logic signals is associated with each controlled rectifier device, with a first logic signal of a pair being associated with the rectification end stop for the controlled rectifier device, and with the second logic signal of the pair being associated with the inversion end stop.

Second means sequentially provides logic signals which initiate a gating or firing of an associated controlled rectifier device. Each logic signal persists until the next logic signal in the sequence appears.

Third means logically combines each of the first and second logic signals for each controlled rectifier device provided by the first means, with the logic signal from the second means which is associated with the immediately preceding controlled rectifier device in the predetermined gating sequence. As long as the error signal results in a firing angle request which falls between the end stops, the second means is under direct control of the error signal. If the error signal requests a firing angle which is advanced past the rectification end stop, a rectification end stop signal provided by the third means inhibits the second means from providing the next logic signal in the sequence until the rectification end stop angle is reached. If the error signal requests a firing angle which is delayed beyond the inversion end stop angle, an inversion end stop signal provided by the third means forces the second means to provide the next logic signal in the sequence when the inversion end stop angle is reached.

The rectification end stop signal and/or the inversion end stop signal may be applied to adjustable delay circuitry, in order to adjustably select a predetermined end stop angle within the adjustment range.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF THE PREFERRED EMBODIMENT

Figure 1:
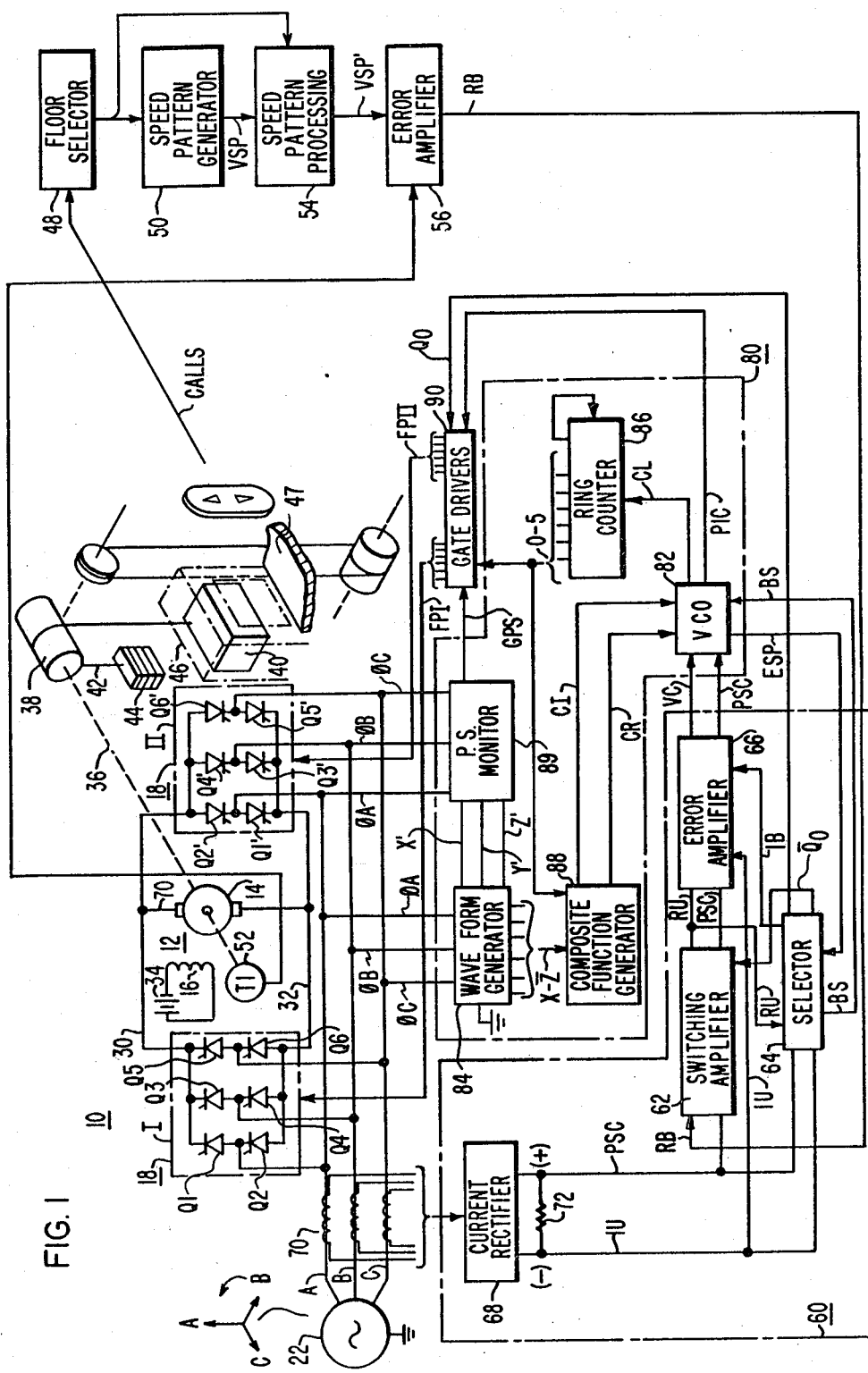
FIG. 1 is a block diagram illustrating converter apparatus of the type which may utilize the teachings of the invention.

Referring now to the drawings, and to FIG. 1 in particular, there is shown converter apparatus 10 constructed according to the teachings of the invention. Converter apparatus 10 is illustrated and will be described relative to its application in an elevator system, but the invention is equally applicable to other applications and should not be limited to the specific example set forth.

More specifically, converter apparatus 10 includes a direct current drive motor 12 having an armature 14 and a field winding 16. The armature 14 is electrically connected to an adjustable source of direct current potential. The source of potential may be a dual converter 18, as illustrated, or a single converter.

The dual converter 18 includes first and second converter banks I and II, respectively, which may be three-phase, full-wave bridge rectifiers connected in parallel opposition. Each converter includes a plurality of static controlled rectifier devices. For example, bank I includes controller rectifier devices Q1, Q2, Q3, Q4, Q5, and Q6 connected to interchange electrical power between alternating and direct current circuits. The alternating current circuit includes a source 22 of alternating potential and line conductors A, B, and C. The direct current circuit includes buses 30 and 32, to which the armature 14 of the direct current motor is connected. The dual bridge converter 18 not only enables the magnitude of the direct current voltage applied to armature 14 to be adjusted, by controlling the conduction or firing angle of the controlled rectifier devices, but it allows the direction of the direct current flow through the armature to be reversed when desired by selectively operating the converter banks. When converter bank I is operational, current flow in the armature 14 would be from bus 30 to bus 32, and when converter bank II is operational, the current flow would be from bus 32 to bus 30.

The field winding 16 of drive motor 14 is connected to a source 34 of direct current voltage, represented by a battery in FIG. 1, but any suitable source such as a single bridge converter may be used.

The drive motor 12 includes a drive shaft indicated generally by broken line 36, to which a traction sheave 38 is secured. An elevator car 40 is supported by a rope 42 which is reeved over the traction sheave 38, with the other end of the rope being connected to a counterweight 44. The elevator car is disposed in a hoistway 46 of a structure having a plurality of floors or landings, such as floor 48, which floors are served by the elevator car.

The movement mode of the elevator car 40 and its position in the hoistway 46 are controlled by a floor selector 48 which in turn selects the polarity of the voltage applied to the armature 14 and the drive motor 12. The magnitude of the direct current voltage applied to armature 14 is responsive to a velocity command signal VSP provided by a suitable speed pattern generator 50.

The speed pattern generator 50 provides its speed pattern VSP in response to a signal from the floor selector 48. A suitable floor selector and a suitable speed pattern generator are shown in U.S. Pat. No. 3,750,850, which is assigned to the same assignee as the present application.

A suitable control loop for controlling the speed, and thus the position of the elevator car 40 in response to the velocity command signal VSP includes a tachogenerator 52 which provides a signal responsive to the actual speed of the elevator car. The speed pattern signal VSP is processed in a processing function 54, and the processed speed pattern VSP' is compared with the actual speed signal from generator 52 in an error amplifier 56. The output signal RB is compared with the actual current flowing in the operational converter bank via a circuit 60. A suitable speed pattern processing function is disclosed in my concurrently filed application Ser. No. 061,538, entitled "Elevator System". Suitable compensation for the error signal is disclosed in U.S. Pat. No. 4,030,570, which is assigned to the same assignee as the present application.

Converter apparatus 10 is operated in a closed current loop mode, using current feedback to operate the converter essentially as a current amplifier. The current comparison circuit 60 includes a switching amplifier 62 which converts the output signal RB from compensation amplifier 58 into a unidirectional signal, a bank selector 64, an error amplifier 66, and a current rectifier 68. Current transformer 70 provides signals responsive to the current flowing in line conductors A, B, and C to the operational converter bank, and the current rectifier 68 provides a unidirectional voltage signal IU across a resistor 72. Conductor PSC is the power supply common.

Unidirectional current feedback signal IU is proportional to the magnitude of the current flowing through the load circuit regardless of the direction of the current flowing through the load. Signal RB is bidirectional with its polarity indicating in which direction the current should flow through the load circuit, i.e., which bridge should be operational, with the magnitude of the bidirectional reference signal indicating the desired magnitude of the load current.

The bidirectional reference signal RB is switched by switching amplifier 62 in response to a switching signal $\overline{Q_0}$, to provide a substantially unidirectional reference signal RU. Intelligence for providing the switching signal $\overline{Q_0}$ for the switching amplifier 62 is provided by the bank selector 64. Bank selector 64 develops switching signal $\overline{Q_0}$, as well as the complement $Q_0$, through logic circuitry and predetermined system parameters.

The unidirectional reference signal RU and the unidirectional feedback signal IU are compared in error amplifier 66, and an error signal VC is developed which has a magnitude and polarity responsive to any difference between the two input signals. The current comparison circuit or function 60 may be the same as set forth in U.S. Pat. No. 3,713,011 and hence it is not described in detail.

The error signal VC is applied to a phase controller 80 which provides firing pulses FPI and FPII for converter banks 16 and 18, respectively. The firing pulses control the conduction angle of the controlled rectifier devices in response to the error signal VC. Bank reversal, and therefore selection of which converter should be operational, is responsive to the switching signals $Q_0$ and $\overline{Q_0}$. In order to maintain synchronism between the phase controller 40 and the converters 16 and 18, the conduction angle is maintained between predetermined limits or end stops, which are referred to as rectification and inversion end stops. A signal ESP is provided by phase controller when the inversion end stop is reached, which is applied to selector 64. Selector 64 also provides a signal BS which forces an inversion end stop condition, and a signal IB which biases the error amplifier 38.

The phase controller 80, which is constructed according to the teachings of the invention, includes a voltage controlled oscillator or VCO 82, a waveform generator 84, a ring counter 86, and a composite function generator 88. The output of the phase controller 80 is applied to gate drivers 90, which in turn provide the firing pulses FPI, or firing pulses FPII, depending upon which bank is operational. Gate drivers 90 may be the same as shown in the hereinbefore mentioned U.S. Pat. No. 3,713,011, or as described in my concurrently filed application Ser. No. 061,532, entitled "Converter Apparatus".

Figure 2:
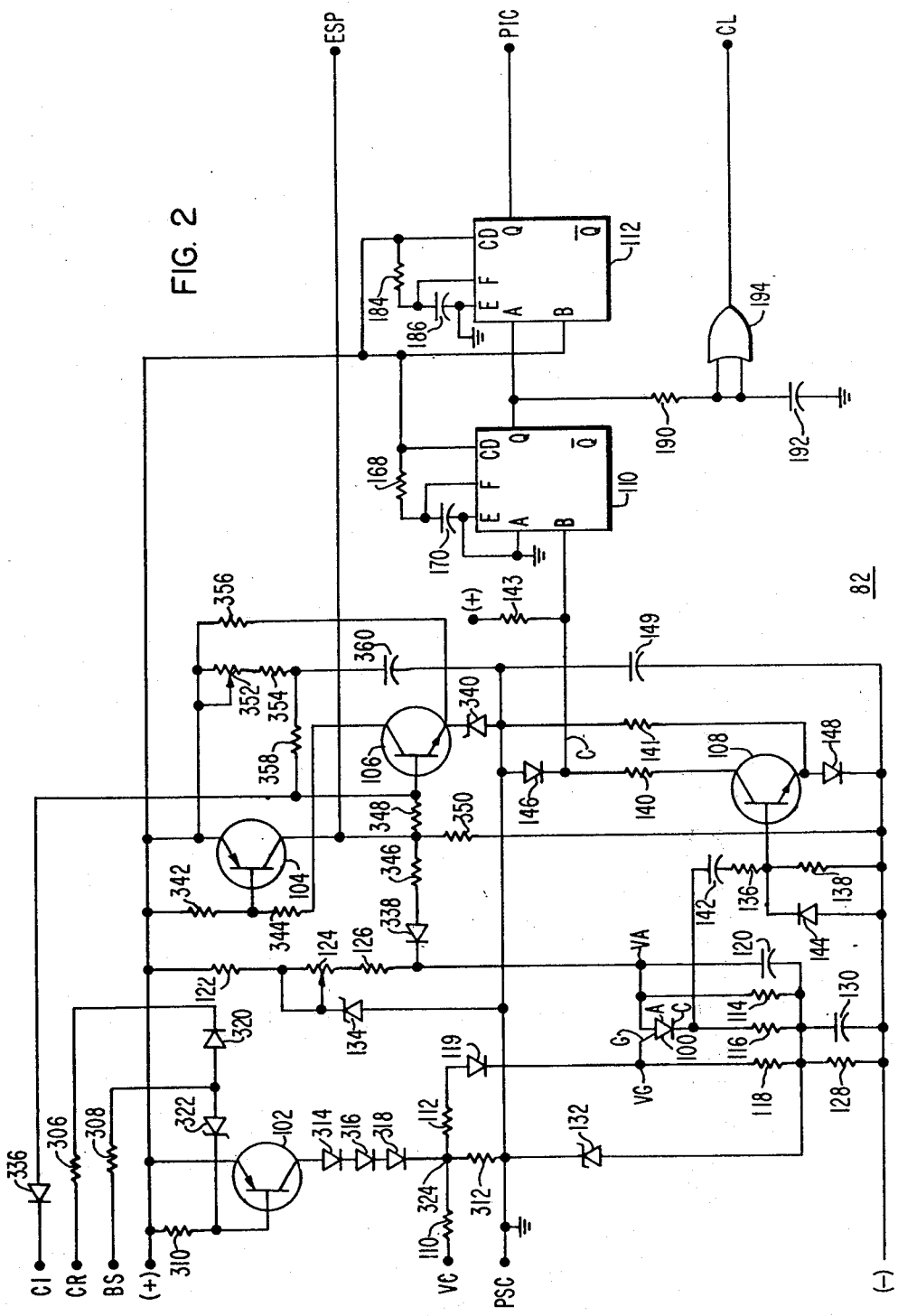
FIGS. 2 and 3 are schematic diagrams which collectively set forth a phase controller constructed according to the teachings of the invention, with FIG. 2 being a schematic diagram of a voltage controlled oscillator, and FIG. 3 being a schematic diagram of a waveform generator, a composite function generator, and a ring counter.
Figure 3:
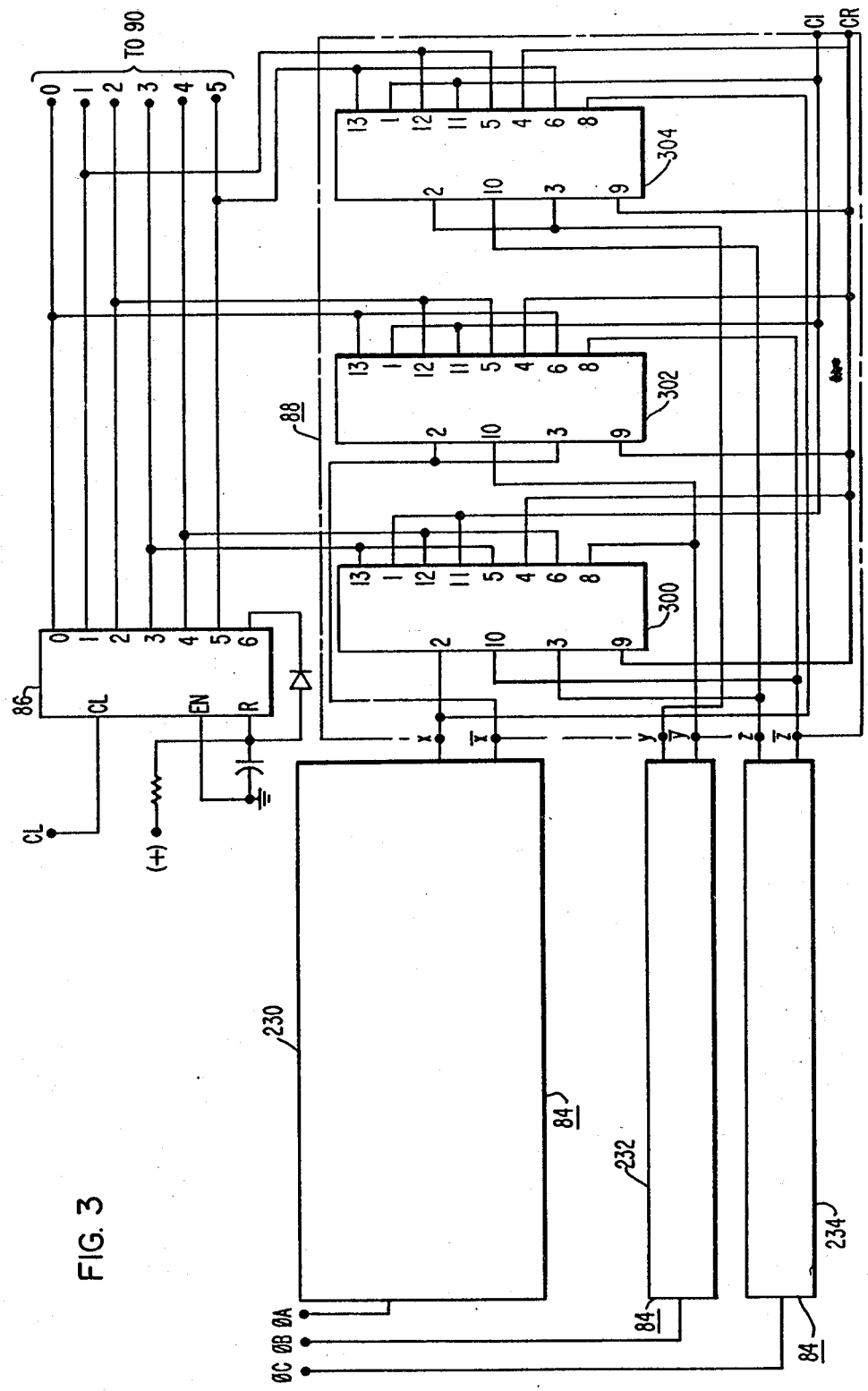

FIGS. 2 and 3 are schematic diagrams which collectively illustrate the phase controller 80 constructed according to teachings of the invention. FIG. 2 illustrates VCO 82, and FIG. 3 illustrates the waveform generator 84, the composite function generator 88, and ring counter 86.

More specifically, VCO 82 shown in FIG. 2 includes a programmable unijunction transistor 100 (PUT 100), which includes gate, anode and cathode electrodes G, A and C, respectively, a PNP transistor 102 associated with the rectification end stop function, PNP and NPN transistors 104 and 106 respectively, associated with the inversion end stop function, and a NPN transistor 108 which provides clocking pulses C for a dual monostable multivibrater, which includes a first mono 110 and a second mono 112.

PUT 100, resistors 110, 112, 114, 116, 118, 124 and 126, diode 119, and capacitor 120, perform the voltage controlled oscillator function. Resistors 122 and 128, capacitor 130 and Zener diodes 132 and 134 establish stabilized reference voltages for oscillator operation, minimizing adverse affects due to any variation in the ±15 volts supply voltages.

Transistor 108, resistors 136, 138, 140, 141, and 143, capacitor 142, and diodes 144, 146 and 148, are connected to amplify the output of the voltage controlled oscillator and provide a suitable clock signal C to the trigger input B of mono 110.

The error signal VC from error amplifier 66 shown in FIG. 1 is applied to the gate G of PUT 100. The anode voltage VA increases as capacitor 120 is charged by current flowing through resistors 124, and 126 until voltage VA is slightly above the gate voltage VG of PUT 100, which is responsive to the control or error signal VC. At this point, PUT 100 starts to conduct, the capacitor 120 discharges through PUT 100, capacitor 142, and resistors 116, 136, and 138, to provide base drive for transistor 108, which in turn produces the trigger pulse C for mono 110. After capacitor 120 discharges, PUT 100 recovers and the process is repeated.

The oscillator repetition rate is adjusted by adjustable resistor 124 when the error signal VC is zero, to provide a rate which is a predetermined multiple of the frequency of the source of alternating potential. The predetermined multiple depends upon whether the source is single or polyphase, and upon whether the bridge converters are full-wave or half-wave rectifiers. With a three-phase, 60 Hz. supply and a three-phase, full-wave bridge rectifier for the converters 16 and 18, six firing channels are required for a converter, and the prescribed multiple is 6. Thus, the clock rate is 60×6 or 360 Hz. With three-phase, half-wave bridge rectifiers, the multiple would be 3, and the clock rate would be 180 Hz. With a single-phase, full-wave bridge, the multiple would be 2 and the clock rate would be 120 Hz. Thus, in the disclosed example, resistor 124 would be adjusted such that with a zero error signal VC, the clock rate would be 360 Hz. If the control signal VC becomes positive, the oscillator repetition rate will decrease, and if VC becomes negative the oscillator repetition rate will increase.

Figure 4:
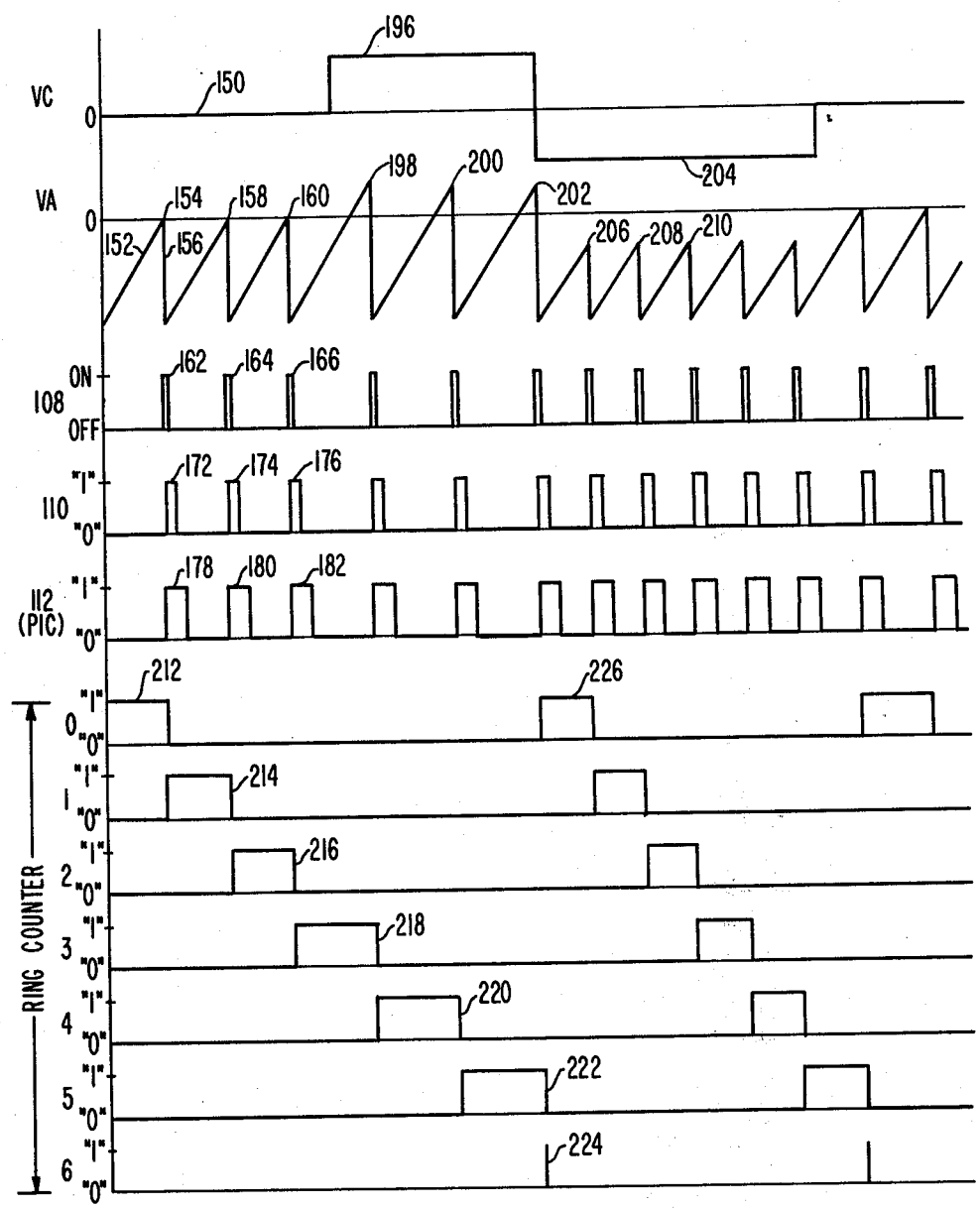
FIG. 4 is a graph which includes waveforms useful in describing the operation of the voltage controlled oscillator and the ring counter of FIGS. 1 and 3.

FIG. 4 is a graph which includes waveforms explanatory of the operation of the voltage controlled oscillator 82. When the error or control voltage VC is zero as shown at 150, the anode voltage VA increases from the negative supply level along curve 152 as capacitor 120 charges, until the voltage VA just exceeds the gate voltage VG, which is zero in this instance. PUT 100 then conducts, the anode voltage VA drops along curve 156 as capacitor 120 discharges, PUT 100 then becomes non-conductive, and the process repeats at the rate of 360 Hz. Each time PUT 100 conducts at points 154, 158 and 160 to discharge capacitor 120 through resistors 136 and 138, transistor 108 switches to its conductive state as shown at 162, 164 and 166, respectively. Each time transistor 108 conducts, mono 110 is triggered with resistor 168 and capacitor 170 controlling the width of the resulting output pulses 172, 174, and 176 appearing at its Q output. For example, pulses 172, 174, and 176 may have a duration of about 25 microseconds. The Q output of mono 110 serves as the trigger pulse for mono 112, providing pulses 178, 180 and 182 having a duration controlled by resistor 184 and capacitor 186 to about 1 millisecond. The output pulses of mono 112 are referred to as signal PIC, which signal is used by the gate drivers 90.

The Q output of mono 110 also provides a delayed clock signal CL for ring counter 86 via a resistor 190, a capacitor 192 and an OR gate 194. This delay, which may be 5 microseconds, eliminates "racing", which may otherwise occur in the operation of the gate drivers 90.

When control signal VC is positive, as shown at 196 in FIG. 4, it takes the anode voltage VA longer to reach the gate voltage, slowing the pulse rate of the voltage control oscillator. Thus, the anode voltage increases past zero, to points 198, 200, and 202, before PUT 100 conducts, and the spacing between the signals provided by transistor 108 and mono 110 and 112 is increased. In like manner, when control signal is VC is negative, as shown at 204, it takes less time for the anode voltage VA to reach the gate voltage VG, increasing the pulse rate of the voltage controlled oscillator. Thus, its anode voltage does not reach zero, firing at points 206, 208 and 210, etc., and the dependent signals from monos 110 and 112 are provided at an increased rate.

The delayed clock signal CL is applied to ring counter 86 shown in FIG. 3. Ring counter 86 is a decade counter/divider connected to function as a six-step counter. Outputs 0, 1, 2, 3, 4 and 5 of ring counter 86 sequentially provide a logic one signal, advancing the logic one from output to output each time it is clocked by the signal CL, which is the delayed Q output of mono 110. The graph of FIG. 4 illustrates the sequential 0, 1, 2, 3, 4 and 5 output signals of ring counter 86. When counter 86 is reset, its output signal 0 provides a logic one signal 212. A few microseconds after signal 172 is provided by mono 110, ring counter 186 is clocked by signal CL and output signal 0 goes to logic zero and output signal 1 simultaneously goes to a logic one to provide signal 214. In like manner, signals 216, 218, 220, and 222 illustrate output signals 2, 3, 4, and 5, respectively. Output 6 is tied back to the reset input of the ring counter, such that when output 6 goes to a logic one at 224 it immediately resets the counter to its initial state, to provide a logic one signal 226 at the zero output. Signals 0–5 are applied to the gate drivers 90, which are shown in detail in my hereinbefore mentioned concurrently filed application. The appearance of each new logic signal in the 0–5 sequence starts the gating process for a different controlled rectifier device. The controlled rectifier devices are gated in the sequence Q1, Q6, Q3, Q2, Q5, and Q4, and are gated by signals 0, 1, 2, 3, 4 and 5, respectively.

Output signals 0-5 are also used as logic signals for the composite function generator 88, in the development of the rectification and inversion end stops for each of the controlled rectifier devices.

In addition to the logic signals 0-5 from the ring counter 86, additional logic signals for the composite function generator 88 are provided by the waveform generator 84 shown in FIGS. 1 and 3. Each of the controlled rectifier devices Q1, Q6, Q3, Q2, Q5 and Q4 must be gated while line voltages $V_{AC}$, $V_{BC}$, $V_{BA}$, $V_{CA}$, $V_{CB}$, and $V_{AB}$ are positive, respectively. The waveform generator 84 provides logic signals related to these line voltages by starting with the phase to neutral voltages A, B, and C. The phase voltages have a predetermined angular relationship with the line voltages. Each of the phase voltages A, B, and C, i.e., the voltages from conductors A, B, and C shown in FIG. 1 to neutral or ground, is applied to a separate phase shift circuit, such as circuits 230, 232, and 234, respectively. Circuits 230, 232, and 234 may be of any suitable construction, or they may be constructed as shown and described in detail in concurrently filed application Ser. No. 061,531, entitled "Timing Waveform Generator". This concurrently filed application is hereby incorporated into the present application by reference.

As shown in FIG. 1, waveform generator 84 may also provide signals X', Y' and Z' for a power supply monitoring function 89. Monitor 89 provides a signal GPS which is a logic one when the power supply is operating properly, and a logic zero when it is not. When signal GPS is at the logic zero level, it may be used to inhibit system operation. Monitor 89 is also shown in detail in the concurrently filed application entitled "Timing Waveform Generator".

Suitable potential transformers (not shown), provide waveforms $\phi A$, $\phi B$, and $\phi C$ of the proper magnitude, which waveforms are synchronous with the phase voltages A, B, and C. Waveforms $\phi A$, $\phi B$, and $\phi C$ are illustrated in FIG. 5, which is a graph setting forth the development of certain logic signals provided by the waveform generator 84.

The phase shift circuit 230 is arranged such that when waveform $\phi A$ goes positive at point 270, the circuit output will switch from a logic zero to a logic one to provide a signal X which goes to a logic one at point 272, with point 272 lagging point 270 by a predetermined number of electrical degrees. The delay in electrical degrees is selected to provide the desired rectification end stop angle. For example, if the desired end stop angle is 25°, the delay between points 270 and 272 would be selected to be 55°, because the line-to-line voltage $V_{AC}$, also shown in FIG. 5, lags the phase voltage waveform $\phi A$ by 30°. Thus, if point 272 of logic signal X lags the zero crossing point 270 of waveform $\phi A$ by 55°, point 272 will lag the zero crossing point 274 of line voltage $V_{AC}$ by 25°, as shown in FIG. 5. Logic signal X persists from point 272 for approximately 180 electrical degrees, going to a logic zero at point 276 which lags the negative going zero crossing point 278 of waveform $\phi A$ by 55°. Thus, logic signal X provides a succession of spaced logic one signals 280, 282, etc., related to the line voltage $V_{AC}$, and its complement logic signal $\overline{X}$ provides a succession of spaced logic one signals 284, 286, etc., which appear in the "spaces" between the $\overline{X}$ logic signals.

Figure 5:
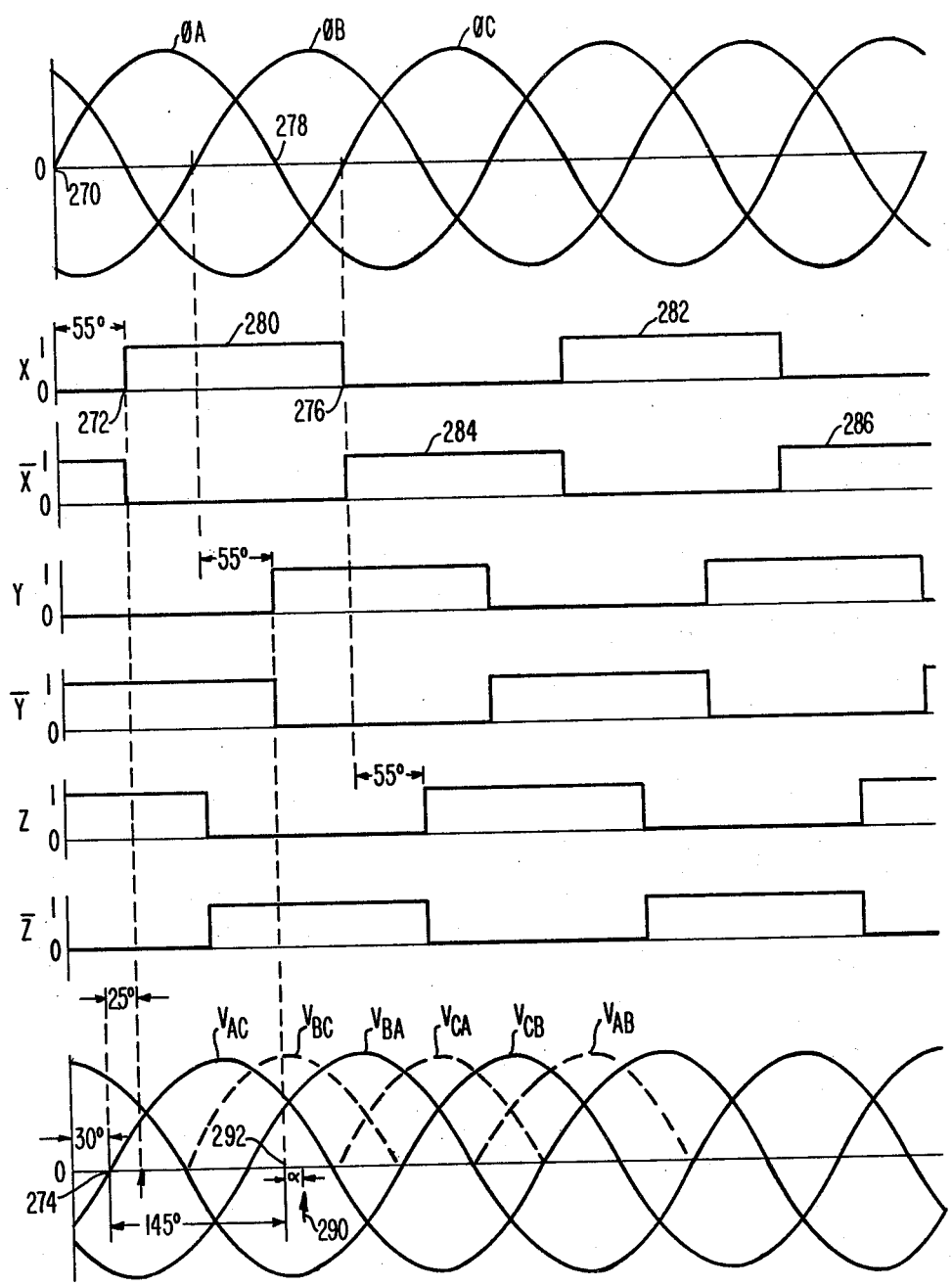
FIG. 5 is a graph illustrating the signals provided by the waveform generator of FIGS. 1 and 3.

In like manner, circuit 232 shown in block form in FIG. 3 is responsive to waveform $\phi B$, providing logic signals Y and $\overline{Y}$ shown in FIG. 5 which are related to line voltage $V_{BA}$ in the same manner in which logic signals X and $\overline{X}$ are phase related to line voltage $V_{AC}$.

Circuit 234 provides logic signals Z and $\overline{Z}$ in response to waveform $\phi C$, which logic signals are phase related to line voltage $V_{CB}$ in the same manner in which logic signals X and X are related to line voltage $V_{AC}$.

Each of the six logic signals X, $\overline{X}$, Y, $\overline{Y}$, Z, and $\overline{Z}$, in logic combination with the six logic signals 0 through 5 from the ring counter 86, as will be hereinafter explained, provide the rectification and inversion end stops for the six controlled rectifier devices of the three-phase, full-wave bridge rectifiers I and II of the dual bridge converter 18.

As pointed out relative to line voltage $V_{AC}$ the rectification end stop for controlled rectifier device Q1 associated with line voltage $V_{AC}$ is provided by the switching of logic signal X from its logic zero level to its logic one level. In like manner, it will be observed from FIG. 5 that logic signal $\overline{Z}$ provides the rectification end stop for device Q6, which is associated with line voltage $V_{BC}$; logic signal Y provides the rectification end stop for device Q3 which is associated with line voltage $V_{BA}$; logic signal $\overline{X}$ provides the rectification end stop for device Q2 which is associated with line voltage $V_{CA}$; logic signal Z provides the rectification end stop for device Q5 which is associated with line voltage $V_{CB}$; and logic signal $\overline{Y}$ provides the rectification end stop for device Q4, which is associated with line voltage $V_{AB}$.

In like manner, each of the six logic signals X, $\overline{X}$, Y, $\overline{Y}$, Z and $\overline{Z}$, in logic combination with the six logic signals 0 through 5 provide the inversion end stops for the six controlled rectifier devices of each of the bridge rectifiers I and II. For example, device Q1 is associated with line voltage $V_{AC}$, and must be gated while line voltage $V_{AC}$ is positive. An angle of 25° following the positive going zero crossing of line voltage $V_{AC}$ was selected as the rectification end stop for device Q1. In other words, the gaing of device Q1 must not occur any earlier than 25° relative to the line voltage $V_{AC}$, and the rectification end stop signal is used to inhibit such gating until the rectification end stop angle is reached. The inversion end stop must be selected to force the conduction of device Q1 a predetermined number of degrees before line voltage $V_{AC}$ goes negative. In other words, if device Q1 is not gated by the time the inversion end stop angle is reached, the inversion end stop signal must initiate the gating thereof. It will be observed from FIG. 5 that logic signal Y switches from logic 0 to logic 1 during the positive half cycle of line voltage $V_{AC}$, at a point 145° from the positive going zero crossing point of line voltage $V_{AC}$. Thus, this point may be selected as the inversion end stop angle. The invention also discloses how this 145° point may be used as a reference to provide a predetermined selected delay angle $\alpha$, to thus provide an inversion end stop at point 290 instead of at point 292, to thus provide an inversion end stop angle of 145°+$\alpha$°. Thus, the inversion end stop for device Q1, associated with line voltage $V_{AC}$ would be provided by logic signal Y; logic signal X provides the inversion end stop for device Q6, which is associated with line voltage $V_{BC}$; logic signal Z provides the inversion end stop for device Q3, which is associated with line voltage $V_{BA}$;

logic signal $\overline{Y}$ provides the inversion end stop for device Q2, which is associated with line voltage $V_{CA}$; logic signal $\overline{X}$ provides the inversion end stop for device Q5, which is associated with line voltage $V_{CB}$; and, logic signal $\overline{Z}$ provides the inversion end stop for device Q4 which is associated with line voltage $V_{AB}$.

The logical pairing of the logic signals X through $\overline{Z}$ and 1 through 5 to provide the rectification and inversion end stops for each device may be determined by considering the requirements of the rectification and inversion end stops. For example, the firing of device Q1 is controlled by logic signal 0 going from a logic zero level to a logic one level. As long as it goes to a logic one between the leading edges of logic signals X and Y, the control signal VC should be allowed to control the gating angle. The controlled rectifier device immediately preceding the gating of device Q1 is device Q4 which is gated by logic signal 5, and logic signal 5 will thus be at the logic one level up until the time that Q1 is gated. Thus, logic signal 5 must be maintained at least until reaching the leading edge of logic signal X. This relationship may be logically determined by AND'ing logic signals X and 5. As soon as the result of AND'ing logic signals X and 5 provides a logic one signal, the control signal VC is allowed to gate the ring counter and thus fire device Q1. When the result of the AND'ing function is a logic zero, VCO 82 is prevented from providing a clock signal CL.

A single composite rectification end stop signal CR may be provided for controlling VCO 82 by OR'ing the various AND functions. Thus, a composite rectification end stop signal CR may be provided by the following logical relationship:

$$CR = (5 \cdot X) + (0 \cdot \overline{Z}) + (1 \cdot Y) + (2 \cdot \overline{X}) + (3 \cdot Z) + (4 \cdot \overline{Y}) \quad (1)$$

When the composite rectification end stop signal CR is a logic zero, VCO 82 is inhibited from providing a clock signal. When signal CR is a logic one, VCO 82 is under control of the control signal VC. If the control signal VC requests a firing angle earlier than the rectification end stop angle, VCO 82 will provide a clock signal CL as soon as signal CR goes to a logic one.

If device Q1 has not been gated on by the time logic signal Y goes to a logic one, the gating of device Q1 should be forced. This point may be determined by AND'ing logic signals Y and 5, as logic signal 5 will remain at the logic one level until device Q1 is fired. Thus, when the result of AND'ing logic signals Y and 5 equals a logic one, device Q1 should be gated. A composite inversion end stop signal CI may be provided by logically OR'ing the various AND functions, as follows:

$$CI = (5 \cdot Y) + (0 \cdot \overline{X}) + (1 \cdot Z) + (2 \cdot \overline{Y}) + (3 \cdot X) + (4 \cdot \overline{Z}) \quad (2)$$

When the composite inversion end stop signal CI is a logic zero, control signal VC may gate the next controlled rectifier device. However, whenever the composite inversion end stop signal CI goes to a logic one, it forces the gating of the next controlled rectifier device in the sequence.

FIG. 3 is a schematic diagram of a composite function generator 88 which will provide the logical functions set forth by relationships (1) and (2) above. Composite function generator 88 includes first, second, and third quad controlled bilateral switches 300, 302, and 304, respectively, such as RCA's CD4066. Logic signals 0 through 5 are connected to the control inputs of the switches, and signals X, $\overline{X}$, Y, $\overline{Y}$, Z and $\overline{Z}$ are inputs to the switches. The twelve switches provide the twelve required logical comparisons, with the outputs of the six AND comparisons in relationship (1) being tied together to provide the composite rectification end stop signal CR, and with the outputs of the 6 AND comparisons of relationship (2) being tied together to provide the composite inversion end stop signal CI. Thus, with output signal 0 being connected to the control input of the switch having logic signal X connected to its input, the output will not go to a logic one until the input signal X is a logic one and the control signal 0 is a logic one, etc. It will be noted that for each of the rectification and inversion end stop functions that since only one of the logic signals 0 through 5 applied to the control inputs is a logic one at any given instant, that the output represented by the composite signal CR, or by the composite signal CI, represents instantaneously only one of the inputs X through Z.

Table I below presents the logical comparisons for each device, in a convenient form.

TABLE I

| Device | Voltage | R | I | Gate | Preceding Gate | R.E.S. | I.E.S. |
|---|---|---|---|---|---|---|---|
| Q1 | $V_{AC}$ | X | Y | 0 | 5 | X . 5 | Y . 5 |
| Q6 | $V_{BC}$ | $\overline{Z}$ | $\overline{X}$ | 1 | 0 | $\overline{Z}$ . 0 | $\overline{X}$ . 0 |
| Q3 | $V_{BA}$ | Y | Z | 2 | 1 | Y . 1 | Z . 1 |
| Q2 | $V_{CA}$ | $\overline{X}$ | $\overline{Y}$ | 3 | 2 | $\overline{X}$ . 2 | $\overline{Y}$ . 2 |
| Q5 | $V_{CB}$ | Z | X | 4 | 3 | Z . 3 | X . 3 |
| Q4 | $V_{AB}$ | $\overline{Y}$ | $\overline{Z}$ | 5 | 4 | $\overline{Y}$ . 4 | $\overline{Z}$ . 4 |

Returning now to FIG. 2, the circuit effect of the composite end stop signals CR and CI on VCO 82 will now be explained. The rectification end stop function includes PNP transistor 102, and input terminal CR to which the composite rectification end stop signal CR from function generator 88 is applied, resistors 306, 308, 310, and 312, diodes 314, 316, 318, and 320, and a Zener diode 322. Input terminal CR is connected to the base electrode of transistor 102 via resistor 306, diode 320, and Zener diode 322. Resistor 308 is connected between an input terminal BS and the junction between diodes 320 and 322. Diodes 314, 316, and 318 are connected between the collector of transistor 102 and the junction 324 between resistors 110 and 112, and resistor 312 is connected between junction 324 and the power supply common PSC. The emitter of transistor 102 is connected to a positive source of unidirectional potential. Thus, when the composite signal CR is at the logic zero level, indicating that the control signal VC should not be allowed to cause VCO 82 to provide a clock signal CL for ring counter 86, transistor 102 will be conductive and the gate voltage VG of PUT 100 will be almost at the value of the positive source of unidirectional potential applied to the emitter of transistor 102. Thus, the anode voltage VA applied to PUT 100 will not reach the gate voltage VG, and PUT 100 will not conduct.

Figure 6:
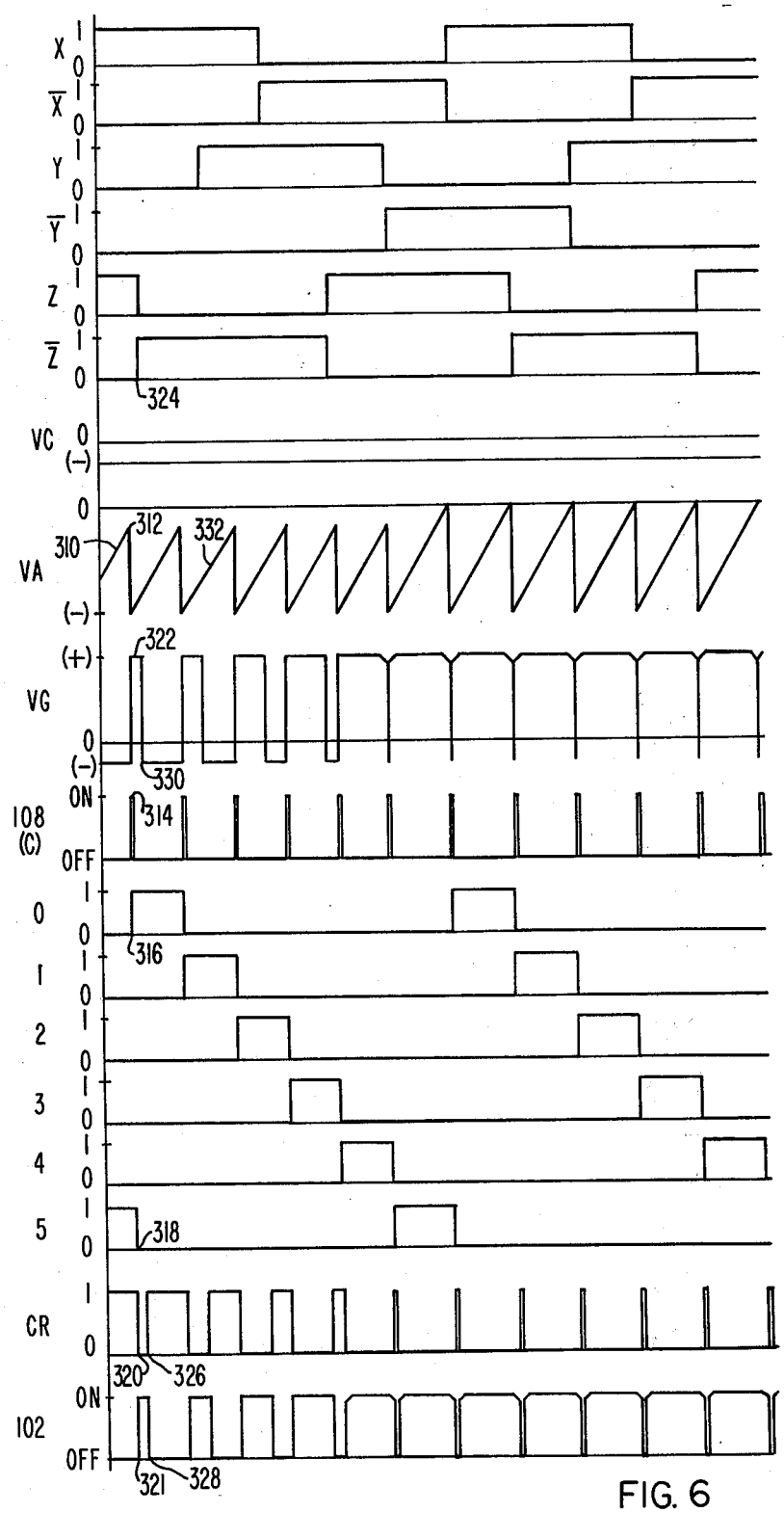
FIG. 6 is a graph which includes waveforms useful in describing the rectification end stop function.

FIG. 6 is a graph which illustrates the operation of the rectification end stop function. Assume the control voltage VC is negative, calling for an increasing output from the operational converter bank. The anode voltage VA of PUT 100 will increase along curve 310 until reaching the gate voltage VG at 312, and PUT 100 will conduct causing transistor 108 to conduct at 314 and provide a clock signal C for mono 110 which in turn initiates clock signal CL. The generation of clock signal CL causes signal 0 to go to a logic one level at 316 and simultaneously terminate logic signal 5 at 318. When signal 0 goes to a logic one, signal Z is at the logic zero level, signal CR goes to logic zero at 320, transistor 102 conducts at 321, and voltage VG applied to the gate of PUT 100 goes high at 322. When signal $\overline{Z}$ subsequently goes high at 324, signal CR goes high at 326, transistor 102 switches off at 328, the gate voltage VG at PUT 100 drops to a negative value at 330, and the anode voltage VA, which is increasing along curve 332 is allowed to reach the gate voltage VG and again fire PUT 100. The firing angle is advancing towards the rectification end stop, and it will be noted that signal CR is zero for longer and longer periods each time, keeping the gate voltage VG high for longer and longer periods until the rectification end stop is reached, signified by the anode voltage VA already exceeding the gate voltage VG at the time the gate voltage VG is allowed to return to normal by signal CR and transistor 102. If signal VC is a constant negative voltage, the frequency of VCO 82 will exceed 360 Hz. and it will be a constant until the rectification end stop is reached. When the rectification end stop is reached, the frequency of VCO 82 will be 360 Hz.

The inversion end stop function is provided by input terminal CI, to which the composite inversion end stop signal CI is applied, diodes 336 and 338, Zener diode 340, resistors 342, 344, 346, 348, 350, 352, 354, 356, and 358, and a capacitor 360. It will be remembered that when signal CI goes to a logic one level that VCO 82 should be forced to provide a clock pulse to advance the ring counter 86 and cause the next controlled rectifier device in the gating sequence to be fired. This function is provided by connecting terminal CI to the base electrode of transistor 106 via diode 336. When the composite end stop signal CI goes high, transistor 106 conducts to provide base drive for transistor 104, turning it on. When transistor 104 becomes conductive it provides a very rapid charging of capacitor 120 via transistor 104, resistor 346, and diode 338. It should be noted that the voltage VA on capacitor 120 due to this charging circuit will exceed the voltage VG, even when transistor 102 is conducting due to the voltage drops across diodes 314, 316, and 318. Thus, even though the rectification end stop signal may be zero, allowing transistor 102 to conduct, the inversion end stop function is operational and will cause VCO 82 to issue a clock pulse at the inversion end stop angle.

As hereinbefore stated, the switching of the inversion end stop signal to a logic one may be a starting point for a predetermined delay angle α which is added to the inversion end stop angle provided by the logic signals. This delay function is provided by resistors 352 and 354 and capacitor 360, with the setting of resistor 352 selecting the magnitude of the delay angle α. While this selectable delay feature is shown applied only to the inversion end stop function, it is to be understood that it may be applied in like manner to the rectification end stop function, if desired.

Figure 7:
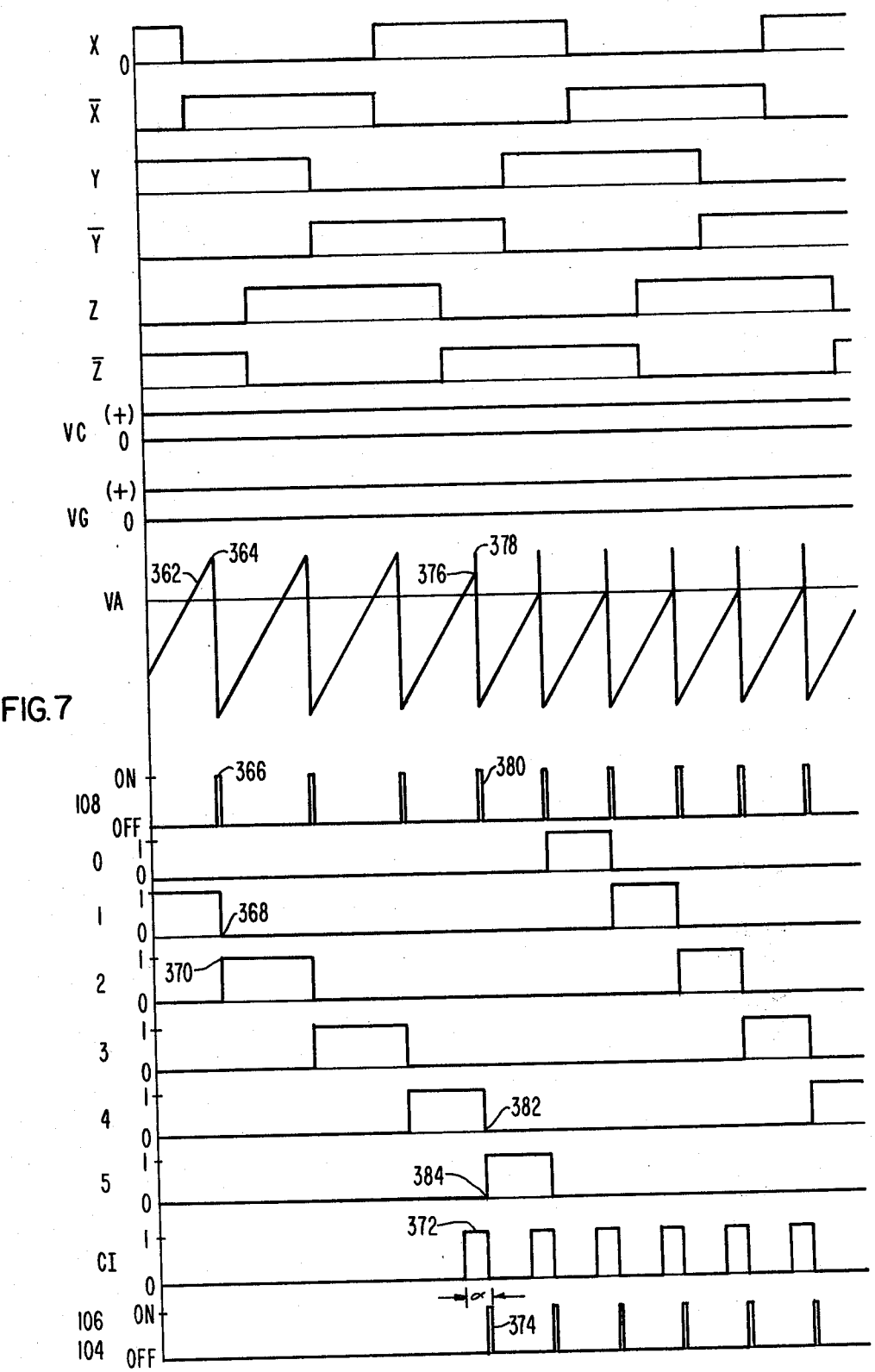
FIG. 7 is a graph which includes waveforms useful in describing the inversion end stop function.

FIG. 7 is a graph which is useful in understanding the inversion end stop function. Assuming that the control voltage VC is positive, calling for a decreasing output from the operational converter bank, the anode voltage VA of PUT 100 will increase along curve 362 until reaching the level of the gate voltage VG at 364, causing PUT 100 to fire and transistor 108 to conduct at 366. Thus, ring counter 86 will be clocked such that output signal 1 goes to a logic zero at 368 and output signal 2 goes to a logic one at 370. The firing angle continues to retard until signal CI goes to a logic one at 372, which is the result of AND'ing signals 4 and $\overline{Z}$. A short time later (α), if the delay feature is operational, transistors 104 and 106 conduct at 374 to rapidly charge capacitor 120, increasing the voltage VA sharply starting at point 376, causing it to increase sharply to the level 378 of the gate voltage VG causing PUT 100 to fire, transistor 108 to conduct at 380 and ring counter to advance, wherein logic signal 4 terminates at 382 and logic signal 5 starts at 384. The frequency of VCO 82, which was initially less than 360 Hz. is 360 Hz. when the VCO 82 is operating at the inversion end stop limit.

The logic zero signal BS from selector 64 applied to input terminal BS of VCO 82 will force an inversion end stop by causing transistor 102 to conduct and prevent VCO from issuing a clock signal until the inversion end stop angle is reached.

I claim as my invention:
1. Converter apparatus, comprising:
a polyphase source of alternating potential,
a load circuit,
converter means having controlled rectifier devices connected to interchange electrical energy between said source of alternating potential and said load circuit,
means providing a feedback signal responsive to a predetermined parameter of said converter means,
means providing a reference signal indicative of the desired operation of said converter means,
means providing an error signal in response to said feedback and reference signals,
first means providing a first plurality of logic signals responsive to said polyphase source of alternating potential, with each of said logic signals being phase shifted by a predetermined angle from a selected voltage of said polyphase source,
second means sequentially providing a second plurality of logic signals, with each logic signal initiating the gating of a selected one of the controlled rectifier devices,
third means logically combining predetermined logic signals from the first and second plurality of logic signals to provide first and second end stop signals for each controlled rectifier device,
and phase controller means responsive to said error signal and to said first and second end stop signals, said phase controller means providing a signal for said second means which causes said second means to issue the next logic signal and gate the associated controlled rectifier device, as required by the error signal, but within the constraints of the first and second end stop signals.

2. The converter apparatus of claim 1 including means delaying at least one of said first and second end stop signals by a predetermined angle, with the phase controller means being responsive to said delayed end stop signal.

3. The converter apparatus of claim 1 wherein each logic signal provided by the second means persists until the next logic signal in the sequence appears, and wherein the third means logically AND's each signal from the first logic means with a selected different signal provided by the second logic means, and logically OR's the results of the logical AND comparisons, to provide the first end stop signal, with the first end stop signal inhibiting the issuance of the next logic signal by the second means when it is at a predetermined logic level, and enabling the issuance of the next logic signal by the second means when it is not at said predetermined logic level.

4. The converter apparatus of claim 1 wherein each logic signal provided by the second logic means persists until the next signal in the sequence appears, and wherein the third means logically AND's each signal from the first logic means with a selected different signal provided by the second logic means, and logically OR's the results of the logically AND comparisons, to provide the second end stop signal, said second end stop signal forcing the issuance of the next logic signal by the second means when it switches to a predetermined logic level.

5. The converter apparatus of claim 1 wherein each logic signal provided by the second means persists until the next signal in the sequence appears, and wherein the third means includes rectification end stop means which logically AND's each signal from the first means with a selected different signal from the second means, and logically OR's the results to provide the first end stop signal, and inversion end stop means which logically AND's each signal from the first means with a selected different signal from the second means, using different AND comparisons than used by said rectification end stop means, and logically OR's the results to provide the second end stop signal, with the first end stop signal inhibiting the issuance of the next logic signal by the second means when it is at a predetermined logic level, and with the second end stop signal forcing the issuance of the next logic signal by the second means when it switches to a predetermined level.

6. The converter apparatus of claim 1 wherein the controlled rectifier devices are gated in a predetermined sequence, the first means provides first and second logic signals for each controlled rectifier device, with the first logic signal changing state when the device may be gated on, and with the second logic signal changing state when the device should be gated on if not already on, the logic signals provided by the second means persists until the next signal in the sequence is provided to gate the next controlled rectifier device in the sequence, the third means provides the first end stop signal for each controlled rectifier device by logically combining its associated first logic signal with the logic signal from the second means which is associated with the immediately preceding controlled rectifier device in the predetermined gating sequence, and the third means provides the second end stop signal for each controlled rectifier device by logically combining its associated second logic signal with the logic signal from the second means which is associated with the immediately preceding controlled rectifier device in the predetermined gating sequence.

* * * * *